( 12 ) United States Patent
de Cesare et al.

(10) Patent No.: US 11,068,419 B1
(45) Date of Patent: *Jul. 20, 2021

(54) SECURE DATA ACCESS BETWEEN COMPUTING DEVICES USING HOST-SPECIFIC KEY

(71) Applicant: Apple Inc., Cupertino, CA (US)

(72) Inventors: Josh P. de Cesare, Campbell, CA (US); Wade Benson, San Jose, CA (US); Fabrice L. Gautier, San Jose, CA (US); Kaiehu Kaahaaina, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,633

(22) Filed: Feb. 10, 2020

Related U.S. Application Data

(63) Continuation of application No. 15/721,636, filed on Sep. 29, 2017, now Pat. No. 10,558,589.

(60) Provisional application No. 62/514,756, filed on Jun. 2, 2017.

(51) Int. Cl.
G06F 12/14 (2006.01)
G06F 21/62 (2013.01)
G06F 21/60 (2013.01)

(52) U.S. Cl.
CPC ........ G06F 12/1408 (2013.01); G06F 21/602 (2013.01); G06F 21/6218 (2013.01); G06F 21/604 (2013.01)

(58) Field of Classification Search
USPC .......................................... 713/193
See application file for complete search history.

(56) References Cited

U.S. PATENT DOCUMENTS

| 5,581,763 | A | 12/1996 | Hait | |
|---|---|---|---|---|
| 7,469,837 | B2 * | 12/2008 | Mizushima | ........... G06F 21/606 235/451 |
| 7,668,945 | B2 | 2/2010 | Doran | |
| 7,818,587 | B2 | 10/2010 | Drew et al. | |
| 8,006,084 | B2 | 8/2011 | Oh et al. | |
| 8,244,989 | B2 | 8/2012 | Benavides | |
| 8,639,928 | B2 | 1/2014 | Bursell | |
| 8,688,971 | B2 | 4/2014 | Ichinose | |
| 8,812,843 | B2 | 8/2014 | Nagai et al. | |

(Continued)

Primary Examiner — Amare F Tabor
(74) Attorney, Agent, or Firm — Kowert, Hood, Munyon, Rankin & Goetzel, P.C.

(57) ABSTRACT

Techniques are disclosed concerning secure access to data in a computing device. In one embodiment, a computing device includes a communication interface, a memory, a memory controller, and a security processor. The communication interface may communicate with a different computing device. The security processor may generate a host key in response to a successful authentication of the different computing device, and then encrypt a memory key using the host key. The security processor may also send the encrypted memory key to the memory controller, and send the host key to the different computing device. The host key may be included by the different computing device in a subsequent memory request to access data in the memory. The memory controller may, in response to the subsequent memory request, use the included host key to decrypt the encrypted memory key and use the decrypted memory key to access the data.

20 Claims, 8 Drawing Sheets

(56) References Cited

U.S. PATENT DOCUMENTS

| | | | |
|---|---|---|---|
| 9,031,238 B2* | 5/2015 | Sarangdhar | G06F 21/72 |
| | | | 380/277 |
| 9,069,940 B2 | 6/2015 | Hars | |
| 9,471,786 B1 | 10/2016 | Buendgen et al. | |
| 9,473,299 B2 | 10/2016 | Arnold et al. | |
| 9,935,768 B2* | 4/2018 | Lee | H04L 9/0894 |
| 9,979,541 B2 | 5/2018 | Matsushita | |
| 2007/0028112 A1* | 2/2007 | Mackelden | H04L 9/0894 |
| | | | 713/176 |
| 2007/0174548 A1* | 7/2007 | Wang | G07F 7/1008 |
| | | | 711/115 |
| 2008/0148371 A1 | 6/2008 | Veneklase | |
| 2014/0108824 A1* | 4/2014 | Nagai | H04L 9/0897 |
| | | | 713/193 |
| 2016/0156468 A1* | 6/2016 | Matsushita | H04L 9/0877 |
| | | | 713/193 |

\* cited by examiner

SECURE DATA ACCESS BETWEEN COMPUTING DEVICES USING HOST-SPECIFIC KEY

PRIORITY INFORMATION

The present application is a continuation of U.S. application Ser. No. 15/721,636, filed Sep. 29, 2017 (now U.S. Pat. No. 10,558,589), which claims priority to U.S. Provisional Appl No. 62/514,756, filed Jun. 2, 2017; the disclosures of each of the above-referenced applications are incorporated by reference herein in their entireties.

BACKGROUND

Technical Field

This disclosure relates generally to computing devices, and, more specifically, to computing devices that support secure data storage.

Description of the Related Art

Computing devices can typically maintain large amounts of personal information, which a user may desire to keep private. If the computing device is acquired by someone with malicious intent (e.g., an identity thief), then the personal data may be at risk of discovery. For example, a user's laptop computer might store contact information of friends and family, photographs, text messages, email, credit card information, etc. In some instances, a computing device may attempt to prevent access to this information by presenting a login screen that requires a user to provide a user name and password in order to obtain access to data stored therein. Accordingly, if a malicious person is unable to provide this information, this person may not be able to gain access. It may, however, still be possible to gain access to data by other means if the data is stored in an unencrypted manner and the malicious person is able to extract the data directly from the memory. For this reason, some computing devices may encrypt the contents of a long-term storage memory, such as, for example, a hard-disk drive.

SUMMARY

The present disclosure describes embodiments in which a computing device implements cryptographic isolation to protect data. In various embodiments, the computing device includes a communication interface, a memory, a memory controller, and a security processor. The communication interface may be configured to communicate with a different computing device. The security processor may be configured to generate a host key in response to a successful authentication of the different computing device, and then to encrypt a memory key using the host key. The security processor may be further configured to send the encrypted memory key to the memory controller, and to send the host key to the different computing device via the communication interface. The host key may be included, by the different computing device, in a subsequent memory request to access data in the memory. The memory controller may be configured to, in response to the subsequent memory request, use the included host key to decrypt the encrypted memory key and use the decrypted memory key to access the data.

In a further embodiment, the computing device may also include a first encryption engine. To encrypt the memory key using the host key, the security processor may be further configured to send the memory key and the host key to the first encryption engine. In one embodiment, the computing device may also include a second encryption engine. To use the included host key to decrypt the encrypted memory key, the memory controller may be further configured to send the encrypted memory key and the host key to the second encryption engine.

In another embodiment, the security processor may be further configured to delete the encrypted memory key in response to a determination that a particular amount of time has elapsed since authentication of the different computing device. In an embodiment, the memory controller may be further configured to store the encrypted memory key in an effaceable memory location.

In one embodiment, the security processor may be further configured to delete the encrypted memory key in response to a determination that a particular amount of time has elapsed since receiving a request from the different computing device. In a further embodiment, the security processor may be further configured to authenticate the different computing device in response to a determination that a user entered a correct passcode using the computing device.

Figure 1:
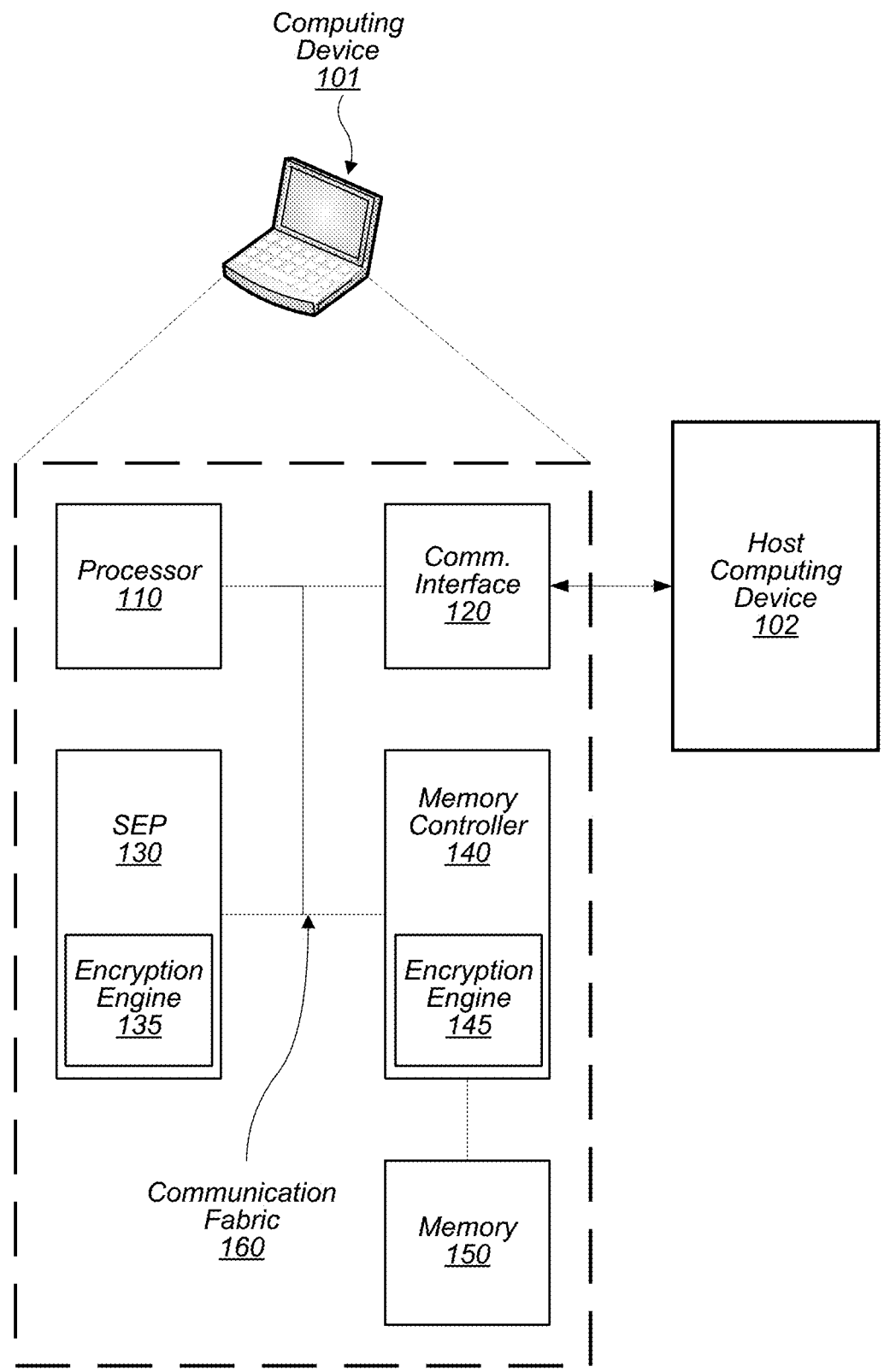
FIG. 1 illustrates a block diagram of an embodiment of a computing device that supports encrypted data storage.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION

Encrypting the contents of a long-term storage memory, such as, for example, hard-disk drives (HDDs) or solid-state storage drives (SDDs), may be useful in preventing an unauthorized person from accessing the contents. In some computing devices, data may be encrypted using a keyword (also referred to herein simply as a "key") whose value is based, at least partially, on a value that is unique to hardware included in the computing device, such as, for example a processor or security processor that includes a unique identification number (UID). This UID may be included in a processor or other integrated circuit (IC) in a computing device by programming a non-erasable, non-volatile memory, such as, e.g., a fuse bank.

If, however, a user has a desire to access encrypted data on a target computing device using a different, host computing device, the different computing device may not be capable of decrypting the data without the UID of the target computing device. To increase a level of security, however, the target computing device may be designed to protect and, therefore, not share, its UID, or any key associated with its UID, with another device. For example, a particular laptop computer encrypts data stored on its HDD using one or more keys that are based on the laptop's UID. If the laptop is damaged or the operating system is corrupted, the laptop may not be usable for accessing the encrypted data stored in the HDD. Swapping the HDD into another computer may not work since the encryption key is based on the UID of the particular laptop, which the other computer cannot access.

Systems and methods are presented which may allow a host computing device to access encrypted data stored in a target computing device. Such systems and methods are contemplated such that the integrity of the encrypted data may be maintained.

A block diagram of an embodiment of a computing device that supports encrypted data storage is illustrated in FIG. 1. Computing Device 101 may correspond to any suitable computer system. Accordingly, in some embodiments, Computing Device 101 may be a mobile device (e.g., a mobile phone, a tablet, personal data assistant (PDA), laptop, etc.), desktop computer system, server system, network device (e.g., router, gateway, etc.), microcontroller, etc. In the illustrated embodiment, Computing Device 101 includes Processor 110, Communication Interface 120, Security Enclave Processor (SEP) 130, Memory Controller 140, and Memory 150. In addition, SEP 130 includes Encryption Engine 135 and Memory Controller 140 includes Encryption Engine 145. In some embodiments, Computing Device 101 (or functional circuits within Computing Device 101) may be implemented as a system-on-chip (SOC) integrated circuit. Computing Device 101 is coupled to another device, Host Computing Device 102.

Processor 110 may, in various embodiments, be representative of a general-purpose processor that performs computational operations. For example, Processor 110 may be a central processing unit (CPU) for Computing Device 101, such as a microprocessor, a microcontroller, an application-specific integrated circuit (ASIC), or a field-programmable gate array (FPGA). In some embodiments, Processor 110 may include multiple CPU cores and may include one or more register files and memories. In various embodiments, Processor 110 may implement any suitable instruction set architecture (ISA), such as, e.g., PowerPC™, or x86 ISAs, or combination thereof. Processor 110, in one embodiment, is configured to execute various software instructions that access data stored in Memory 150, such as an operating system and one or more user applications.

Communication Interface 120 may include interface controllers for various interfaces external to Computing Device 101, including interfaces such as Universal Serial Bus (USB), peripheral component interconnect (PCI) including PCI Express (PCIe), small computer system interface (SCSI) including serial attached SCSI and Firewire, as well as other serial and parallel ports. Communication Interface 120 may, in some embodiments, include networking peripherals such as, for example, Ethernet media access controllers (MACs). Data exchange via Communication Interface 120 may be managed by Processor 110, for example, by execution of driver software executing on Processor 110.

Secure Enclave Processor (SEP) 130, in the illustrated embodiment, is a secure processor configured to generate and maintain user keys for encrypting and decrypting memory keys. As used herein, the term "secure processor" refers to a processing circuit that protects an isolated, internal resource from being directly accessed by an external circuit such as Processor 110. Furthermore, a "memory key," as used herein, refers to any key that may be used to encrypt or decrypt data stored in a memory. In various embodiments, a particular memory key may be used to encrypt all data in a given memory, such as a disk drive (e.g., a disk key), all data in a particular portion or volume, of the given memory (e.g., a volume key), data associated with a given file (e.g., a data key), or any other suitable grouping of data. The protected internal resource may include memory that stores sensitive data such as user keys. SEP 130 may also include circuitry, such as, for example, Encryption Engine 135, that is configured to performs services/operations associated with sensitive data, such as perform encryption and decryption using stored user keys. SEP 130 is configured to encrypt memory keys with stored user keys for storage in Memory 150, and decrypt memory keys when needed for encryption or decryption of user data stored in Memory 150. SEP 130 may generate keys using, for example, a unique identifier (UID), a random number generator, a user supplied password, or any combination thereof. In some embodiments, SEP 130 may generate keys using a UID that is embedded in hardware, or programmed in a non-erasable memory, and is unique to each Computing Device 101 that is manufactured. In various embodiments, SEP 130 may require that a user supply a password, or other credential, to unwrap a key after certain events. Certain events may include, for example, a restart of Computing Device 101, or a user unlocking a locked screen of Computing Device 101.

Memory Controller 140, in one embodiment, is configured to facilitate accessing data stored in Memory 150, which may include various user data and system files. Memory Controller 140 may generally include circuitry for receiving requests for memory operations from the other components of Computing Device 101 and for accessing Memory 150 to service those requests. Accordingly, Memory Controller 140 may include circuitry for issuing read and write commands to Memory 150, performing logical-to-physical mapping for data in Memory 150, etc. In some embodiments, Memory Controller 140 includes circuitry configured to handle various physical interfacing (PHY) functionality to drive signals to Memory 150. Memory 150 may, in some embodiments, include a removable hard-disk drive (HDD) or Solid-State Drive (SSD). In some embodiments, Memory 150 may include various forms of solid-state memory such as NAND flash memory, NOR flash memory, nano RAM (NRAM), magneto-resistive RAM (MRAM), phase change RAM (PRAM), etc. In various embodiments, Memory Controller 140 is configured to send data read from Memory 150 over Communication Fabric 160 to various components of Computing Device 101 such as Communication Interface 120. In such an embodiment, Memory Controller 140 may be configured to implement a direct memory access (DMA) controller that coordinates DMA transactions to exchange information associated with read and write operations over Communication Fabric 160 to other components, including circuit blocks 110-130. Memory Controller 140 further includes circuits for handling secure data stored in Memory 150, such as, e.g., Encryption Engine 145.

Encryption Engines 135 and 145 may be similar blocks for performing similar types of operations. In one embodiment, Encryption Engines 135 and 145 include circuitry configured to encrypt and decrypt data using a provided key. Encryption Engines 135 and 145 may implement any suitable encryption algorithm such as Data Encryption Standard (DES), Advanced Encryption Standard (AES), Rivest Shamir Adleman (RSA), Elliptic Curve Cryptography (ECC), etc. In the illustrated embodiment, Encryption Engine 135 is configured to encrypt and decrypt key and passcodes used in Computing Device 101 using a key provided by SEP 130. SEP 130 may store and maintain one or more keys and/or passcodes used for accessing sensitive data. Each of the stored keys may be encrypted using a particular user key, such that data stored for a first user of Computing Device 101 may be secured from other users of Computing Device 101. Encryption Engine 145 is configured to encrypt data being written to Memory 150 by Memory Controller 140 and decrypt data being read from Memory 150 by Memory Controller 140. Memory Controller 140 provides a key for Encryption Engine 145 to use for particular cryptographic operations. Both Encryption Engines 135 and 145 may include a data buffer for storing data used in a particular cryptographic operation. In some embodiments, Encryption Engine 145 may have a larger data buffer than Encryption Engine 135 that may allow Encryption Engine 145 to handle large data files being stored into Memory 150 more efficiently.

Communication Fabric 160 may be any communication interconnect for communicating among the components of Computing Device 101. Communication Fabric 160 may be bus-based, including shared bus configurations, cross bar configurations, and hierarchical buses with bridges. Communication Fabric 160 may also be packet-based, and may be hierarchical with bridges, cross bar, point-to-point, or other interconnects.

As noted above, in various embodiments, Computing Device 101 is configured to implement cryptographic security for user data stored in Memory 150 in order to prevent an unauthorized user from accessing this data. This cryptographic security may, in some embodiments, prevent, or at least deter, an unauthorized user from removing some or all of Memory 150 and attempting to access the secured data using a different computing device.

In some cases, however, an authorized user may desire to access the secured contents in Memory 150 using another computing device, such as, e.g., Host Computing Device 102. For example, an authorized user may want to use a different device if Computing Device 101 has a keyboard, mouse, or other input device that is damaged, preventing full functionality, or a damaged display that prevents legible images from being displayed. In some situations, an operating system may become corrupted, preventing normal operation from occurring. Computing Device 101, in the illustrated embodiment, includes a procedure for gaining access to secure data in Memory 150. A user accessible boot command is included that causes Computing Device 101 to bypass a standard boot process, including bypassing the load and execution of the operating system. In this non-standard boot mode, referred to herein as a "target disk mode," Computing Device 101 may behave like an external storage drive when coupled to Host Computing Device 102 via Communication Interface 120. Upon completing proper authorization via Host Computing Device 102, the authorized user may use Host Computing Device 102 to access data, including the secured data in Memory 150, stored in Computing Device 101.

While operating in target disk mode, Computing Device 101, in the illustrated embodiment, may allow its file system to be mapped into the file system of Host Computing Device 102 as an external drive. If Host Computing Device 102 attempts to read encrypted data from Memory 150, Host Computing Device 102 may receive the requested data, still encrypted. In the illustrated embodiment, the data is encrypted using a key generated by SEP 130 using a UID specific to the hardware of Computing Device 101 and may also include a passcode or other credentials to identify a particular user of Computing Device 101. Host Computing Device 102, therefore, may not be capable of decrypting the received data since it has a different UID, even if the same user credentials are used on Host Computing Device 102.

In response to an unsuccessful attempt to decrypt the received data, Host Computing Device 102 sends a request to Computing Device 101, requesting access to the encrypted data. In response to this request, Computing Device 101 request authentication from Host Computing Device 102 to verify if the user of Host Computing Device 102 is authorized to access the encrypted data. In some embodiments, software running on Host Computing Device 102 may prompt the user to enter a passcode or other form of identification. Host Computing Device 102 sends the user's identification to Computing Device 101. SEP 130 is used to validate that the user of Host Computing Device 102 is authorized to access the encrypted data, and, in turn, generates a host key for use by Host Computing Device 102. SEP 130 may also encrypt the memory key used to encrypt the data, using the host key, and send this encrypted memory key to Memory Controller 140.

After receiving the host key from Computing Device 101, Host Computing Device 102 may send another memory access request to Computing Device 101 to read the encrypted data, along with the host key. Upon receiving this memory access request, Memory Controller 140, in the illustrated embodiment, reads the requested encrypted data from Memory 150, decrypts the encrypted memory key, uses the decrypted memory key to decrypt the requested data, and then sends the decrypted data to Host Computing Device 102. In some embodiments, Memory Controller 140 may encrypt the data using the host key before sending to Host Computing Device 102.

It is noted that, the memory key is not sent to the host, encrypted or not. The host merely receives the host key that is generated by SEP 130. In addition, in target disk mode, SEP 130 and/or Memory Controller 140 may determine a time period for which the host key is valid. In various embodiments, the time period may correspond to a length of time that the target disk mode session is active, a time period during which Computing Device 101 and Host Computing Device 102 are physically coupled, a predetermined length of time that is independent of a status of Host Computing Device 102 or Computing Device 101, or similar suitable length of time. Upon the time period elapsing, SEP 130 and/or Memory Controller 140 may delete any existing copies of the host key as well as copies of the memory key encrypted with the host key.

It is also noted that the block diagram of FIG. 1 is merely an example. In other embodiments, Computing Device 101 may include additional and/or different functional circuits. The processor, for example, may include multiple cores and/or a cache memory.

Figure 2:
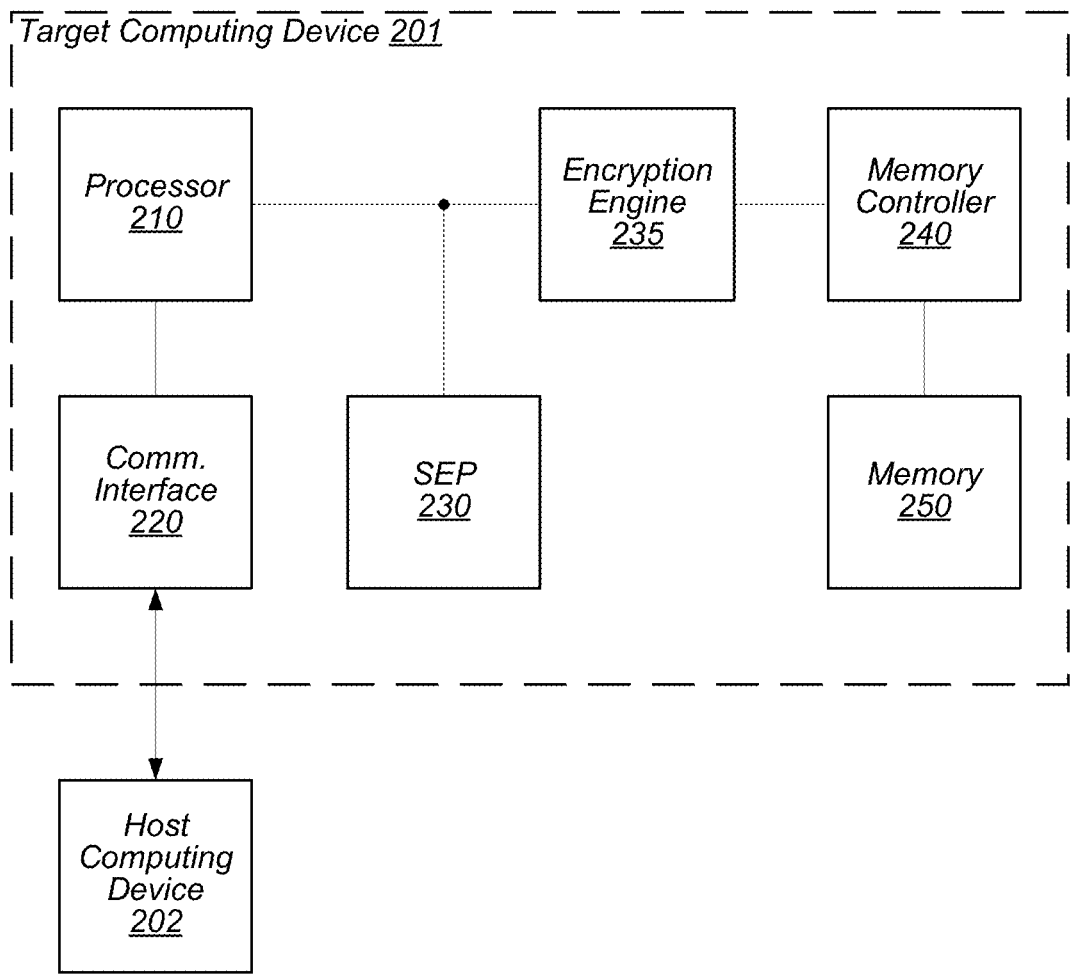
FIG. 2 shows a block diagram of another embodiment of a computing device that supports encrypted data storage.

Turning now to FIG. 2, a block diagram of another embodiment of a computing device that supports encrypted data storage is shown. Target Computing Device 201 includes Processor 210, Communication Interface 220, Security Enclave Processor (SEP) 230, Encryption Engine 235, Memory Controller 240, and Memory 250. Target Computing Device 201 is coupled to Host Computing Device 202.

In the illustrated embodiment, the circuit blocks of Target Computing Device are as described above for the similarly named and numbered circuit blocks in FIG. 1, except as disclosed below. Target Computing Device 201, similar to Computing Device 101 in FIG. 1, may encrypt data before storing in Memory 250. To accomplish the encrypting and decrypting of data, Target Computing Device includes Encryption Engine 235.

Encryption Engine 235, similar to Encryption Engine 145 in FIG. 1, includes circuitry configured to encrypt data being written to Memory 250 by Memory Controller 240 and decrypt data being read from Memory 250 by Memory Controller 140. Encryption Engine 235 may implement any suitable encryption algorithm such as Data Encryption Standard (DES), Advanced Encryption Standard (AES), Rivest Shamir Adleman (RSA), Elliptic Curve Cryptography (ECC), etc. In the illustrated embodiment, Encryption Engine 235 is configured to encrypt and decrypt data with a key provided by Memory Controller 240. In some embodiments, SEP 230 may also use Encryption Engine 235 to Encrypt and decrypt keys, while in other embodiments, SEP 230 may include separate cryptographic circuits.

As data is stored into Memory 250, Memory Controller 240 utilizes Encryption Engine 235 to encrypt the data before storing the encrypted data into Memory 250. As an example of a data write to Memory 250, Memory Controller 240 receives a user key from SEP 230. The particular user key that is used may correspond to a user currently logged into Target Computing Device 201. Memory Controller 235 uses the received user key to unlock a memory key to be used to encrypt the data that is being written to Memory 250. In various embodiments, the memory key may be used for all data stored in Memory 250, or a portion of the data stored in Memory 250, such as a particular disk or volume, or for a particular data file. Using the decrypted memory key, Memory Controller 240 encrypts the data to be written utilizing Encryption Engine 235, and then stores the data in a suitable location in Memory 250. To read encrypted data from Memory 250, a similar process is followed. When a memory read request is received, Memory Controller 240 requests a user key from SEP 230. As before, the user key may correspond to a user currently logged into Target Computing Device 201. After receiving the user key, Memory Controller 240 uses the received user key to decrypt a memory key that corresponds to the requested data. Using the decrypted memory key, Memory Controller 240 reads the requested data from Memory 250 and decrypts it utilizing Encryption Engine 235. If the current user is authorized to read the data, the decrypted data is available for the user's use. Otherwise, decrypting the data with an invalid memory key results in improperly decrypted data that will be not correspond to the originally stored data.

After use, Memory Controller 240, in the illustrated embodiment, may discard any local copies of the decrypted keys that are stored in volatile memory such as RAM or registers. Additional memory request, in such embodiments, therefore result in a repeat of the disclosed read and write processes.

Target Computing System 201, similar to Computing System 101, may support a target disk mode for accessing data stored in Memory 250 by another device, such as, for example, Host Computing Device 202. In one embodiment, Host Computing Device 202 sends, via Communication Interface 220, a memory read request to Target Computing Device 201, which is in target disk mode. Memory Controller 240 receives the requests, and sends the requested data to Host Computing Device 202 without decrypting the requested data. Host Computing Device is unable to successfully decrypt or read the received data, and in response, sends a request to Target Computing Device 201 to be authenticated. Software executing in Processor 210 sends an authentication request to a user of Host Computing Device 202. If the user provides a valid reply to the authentication request, then SEP 230 sends a host key to Host Computing Device 202. SEP 230 also encrypts the memory key corresponding to the requested data and sends this encrypted memory key to Memory Controller 240. After receiving the host key, Host Computing Device 202 may resend the request for the data and include the host key with the request.

Memory Controller 240 receives the request along with the host key. Using the host key, Memory Controller 240 sends the host key along with the encrypted memory key to Encryption Engine 235 for decryption. Using the decrypted memory key, Memory Controller 240 reads the requested data from Memory 250 and sends this, still encrypted, data to Encryption Engine 235, along with the decrypted memory key to decrypt the requested data. The decrypted data is sent to Host Computing Device 202.

In some embodiments, however, Memory Controller 240 will send the decrypted data, along with the host key, to Encryption Engine 235 to encrypt the requested data with the host key. The requested data, encrypted with the host key, is then sent to Host Computing Device 202. Host Computing Device 202 may then decrypt the received data using the host key.

In the illustrated embodiment, Host Computing Device may also send data to Target Computing Device 201 for storage in Memory 250. The process is similar for storing data as for reading data. Assuming Host Computing Device 202 has a host key (if not, the same request for authentication is sent, as previously described), then Host Computing Device sends the data to be stored to Target Computing Device 201, along with the host key. Memory Controller 240 receives the write request and host key, and uses the host key to decrypt the memory key. Using the decrypted memory key, Memory Controller 240 sends the received data to Encryption Engine 235 to encrypt the received data. Memory Controller 240 then stores the data encrypted with the memory key into a suitable location in Memory 250.

In some embodiments, Host Computing Device 202 may send the data to be stored encrypted with the host key. In such an embodiment, Memory Controller 240 sends the encrypted data and the host key to Encryption Engine 235 to decrypt the data before encrypting the data with the memory key.

As described above, Memory Controller 240 may discard, after use, any local copies of the decrypted keys that are stored in volatile memory such as RAM or registers. In such embodiments, additional memory requests from Host Computing Device 202, therefore, result in a repeat of the target disk mode read and write processes.

It is noted that FIG. 2 is an example for demonstrating the disclosed concepts. In various embodiments, Target Computing Device 101 and Host Computing Device 202 may include additional and/or different functional circuits. Although only one Host device and one target device are shown in FIG. 2, it is contemplated that additional host devices may be coupled to the target device, and vice versa.

Figure 3:
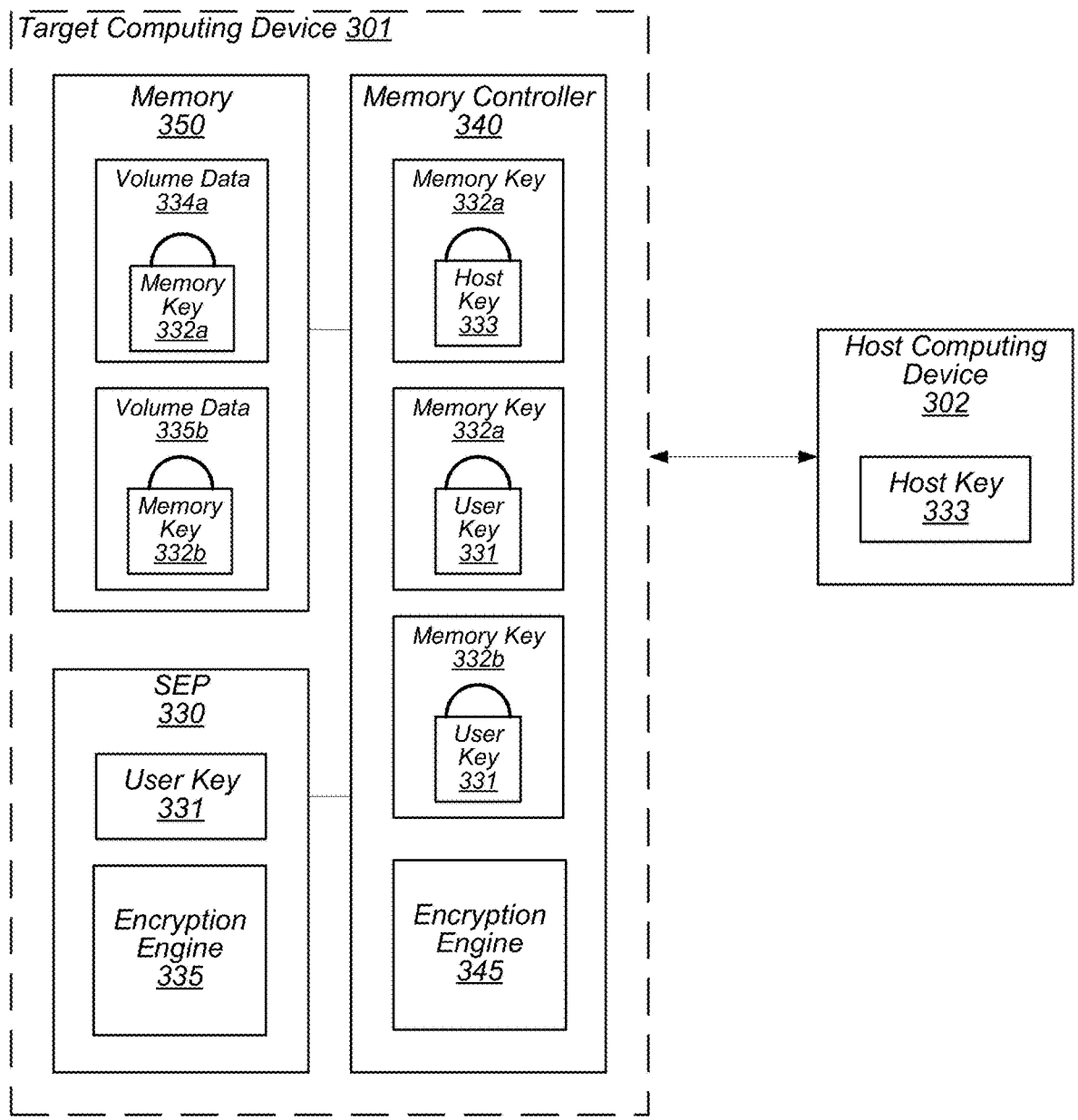
FIG. 3 depicts encryption key management in an embodiment of a computing device.

Moving now to FIG. 3, encryption key management in an embodiment of a computing device is depicted. FIG. 3 illustrates which data and keys are encrypted and where they are stored within the target and host devices when the target device is in a target disk mode and the host device has been authorized to access at least a portion of encrypted data in Memory 350. Target Computing Device 301 includes Security Enclave Processor (SEP) 330, Memory Controller 340, and Memory 350. SEP 330 and Memory Controller 340 include Encryption Engine 335 and Encryption Engine 345, respectively. Target Computing Device 301 is communicatively coupled to Host Computing Device 302. Both Target Computing Device 301 and Host Computing Device 302, may, in some embodiments, correspond to the similarly named and numbered devices described above for FIGS. 1 and 2. Descriptions of the devices and their respective components correspond to the previous descriptions, with exceptions described below.

In the illustrated embodiment, Memory 350 includes two volumes for storing data, Volume Data 334*a* and Volume Data 334*b*. Each volume is encrypted using a respective memory key. Volume Data 334*a* is encrypted with Memory key 332*a* and Volume Data 334*b* is encrypted using Memory key 332*b*. Memory Controller 340 is shown with three encrypted keys: Memory key 332*a* encrypted using Host Key 333, Memory key 332*a* encrypted with User Key 331, and Memory key 332*b* encrypted with User Key 331.

In one embodiment, User Key 331 may be generated by SEP 330 when a corresponding account is generated on Target Computing Device 301. SEP 330 may utilize a UID specific to Target Computing Device 301 to generate User Key 331. When the corresponding user account is active on Target Computing Device 301, then User Key 331 may be used for decrypting the appropriate Memory key 332*a-b* when accessing Volume Data 334*a-b* in Memory 350. User Key 331 is stored within SEP 330 and is provided to Memory Controller 340 as needed to access Volume Data 334*a* and Volume Data 334*b*. In some embodiments, SEP 330 and Memory Controller 340 may communicate via a dedicated secure interface that is separate from a system bus.

When, however, Target Computing Device 301 is in target disk mode and Host Computing Device 302 is accessing Memory 350, then SEP 330 generates Host Key 333 in response to a successful authentication by a user of Host Computing Device 302. A "successful authentication" may refer to a challenge issued by Target Computing Device 301 in the form of a user name and password request or a request for another form of identity verification, including, for example, biometric data, from Host Computing Device 302. In contrast to User Key 331, Host Key 333 is not generated using the UID associated with Target Computing Device 301. SEP 330 may use a random number generator circuit for generating Host Key 333, and in some embodiments, may include authentication data received from Host Computing Device 302 when generating Host Key 333. Avoiding use of the UID of Target Computing Device 301 and User Key 331 may help to protect the security of encrypted data in Memory 350 by avoiding sending any version of the UID or User Key 331 external to Target Device 301. Furthermore, Host Key 333 may be ephemeral, i.e., may be valid for a limited time period, after which Host Key 333 is deleted, as well as the copy of Memory key 332*a* that is encrypted with Host Key 333.

SEP 330 sends Host Key 333 to Host Computing Device 302, where it is stored during the valid time period. Host Computing Device 302 uses Host Key 333 when sending a memory access request to Target Computing Device 301. In some embodiments, Host Computing Device 302 may include a security processor with a secure storage area for storing Host Key 333, while in other embodiments, Host Key may be stored in a volatile memory until the target disk mode session is over, or until the valid time period for Host Key 333 has expired.

SEP 330 also uses Host Key 333 to encrypt a copy of Memory Key 332*a* which is then sent to Memory Controller 340 as shown. Memory Controller 340, therefore, holds two copies of Memory Key 332*a*, one encrypted with Host Key 333 and the other encrypted with User Key 331. It is noted that Memory Controller 340 does not include Memory Key 332*b* encrypted with Host Key 333. In some embodiments, the user of Host Computing Device 302 may not be authorized to access Volume Data 334*b*. In other embodiments, Host Computing Device 302 may not have yet requested access to Volume Data 334*b*. In some embodiments, Memory Key 332*a* encrypted with Host Key 333 may be stored in an effaceable memory location. As used herein, an "effaceable memory location" refers to a non-volatile memory that when an erase operation is performed on a given memory location, contents of the memory location are physically erased. In contrast, in an non-effaceable memory, to reduce an amount of program and erase cycling in the memory, a memory location may only be marked for erasure in response to an erase operation. A physical erase of the memory location may be postponed until a later time when more locations in the memory have been marked for erasure. Using an effaceable memory may provide additional security by physically erasing an ephemeral key in response to an expiration of the key, leaving little to no trace of the value of the key.

It is also noted that FIG. 3 is merely one example for illustrating how encrypted data and the associated encryption keys are managed in a computing device. In other embodiments, additional levels of encryption may be used, such as, for example, encrypting individual data files within each storage volume. Additional keys may be utilized in other embodiments. It is further contemplated that the various keys may be stored in locations other than as illustrated in FIG. 3.

Figure 4:
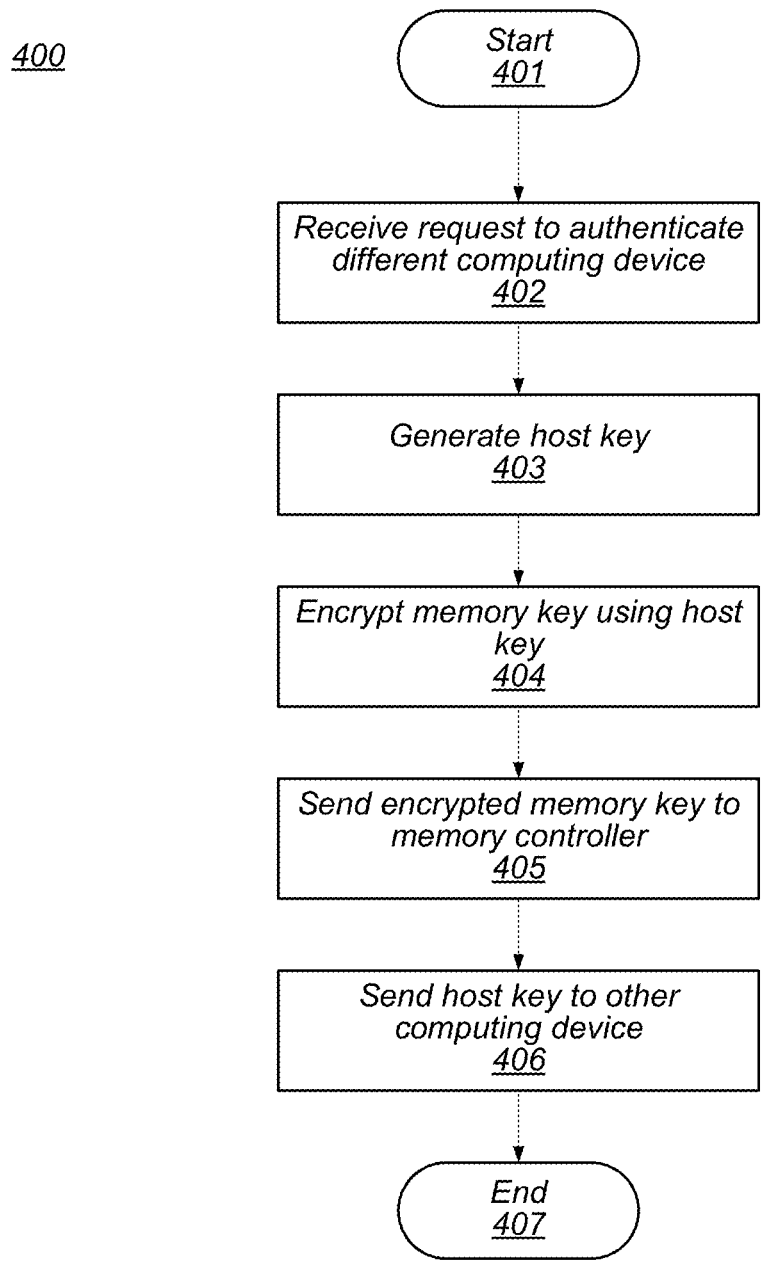
FIG. 4 illustrates a flow diagram of an embodiment of a method for establishing a data sharing session between two computing devices.

Proceeding now to FIG. 4, a flow diagram of an embodiment of a method for establishing a data sharing session between two computing devices is illustrated. In various embodiments, Computing Device 101, or Target Computing Devices 201 or 301 in FIGS. 1-3, may perform Method 400 while in a target disk mode. Referring collectively to FIG. 2 and the flow diagram of FIG. 4, Method 400 begins in block 401.

A target computing device receives a request to authenticate a different computing device (block 402). In the illustrated embodiment, Target Computing Device 201, while in target disk mode, receives a request from Host Computing Device 202 to authenticate a user in order to access Memory 250. Processor 210 in Target Computing Device 201 sends a security challenge to Host Computing Device 202 in response to the request. The security challenge, may include any of a username and password, biometric data (e.g., a fingerprint or facial recognition), a pattern entered on a touch sensitive input device, and the like. Assuming the user successfully completes the authentication, e.g., a correct username and password combination are entered, the method proceeds to block 403.

The target computing device generates a host key (block 403). SEP 230 generates a host key for use by Host Computing Device 202. SEP 230 may use a random number generator circuit and/or all or a portion of received authentication data to generate the host key. SEP 230 may also establish a time period for which the host key is valid.

The target computing device encrypts a memory key using the host key (block 404). In some embodiments, SEP 230 encrypts a memory key for each volume in Memory 250 that the user is authorized to access. In other embodiments, SEP 230 may encrypt a memory key corresponding to a memory location to which Host Computing Device 202 is requesting access. SEP 230 uses the generated host key for encrypting the memory key.

The encrypted memory key is sent to a memory controller (block 405). SEP 230 sends the encrypted memory key, or keys if more than one memory key is encrypted, to Memory Controller 240. SEP 230 may communicate with Memory Controller 240 via a secure interface that is separate from other bus interfaces included in Target Computing Device 201. For example, SEP 230 may utilize a "mailbox" delivery protocol in which a particular memory location within SEP 230 is dedicated to Memory Controller 240. To send the encrypted memory key, SEP 230 stores the encrypted memory key in this location and then alerts Memory Controller 240 that a message is ready to be received. Memory Controller 240 may then read the location over the dedicated interface to retrieve the encrypted memory key.

The host key is sent to the different computing device (block 406). SEP 230 sends the host key to Host Computing Device 202 via Communication Interface 220. In some embodiments, the host key may be encrypted before being sent, for example, using a Diffie-Hellman key exchange or other suitable method. In other embodiments, the connection between Target Computing Device 201 and Host Computing Device 202 may be considered safe, and the host key may be sent without encryption. The method ends in block 407.

It is noted that the method illustrated in FIG. 4 is merely an example. In other embodiments, additional operations may be included or some operations may be performed in a different order.

Figure 5:
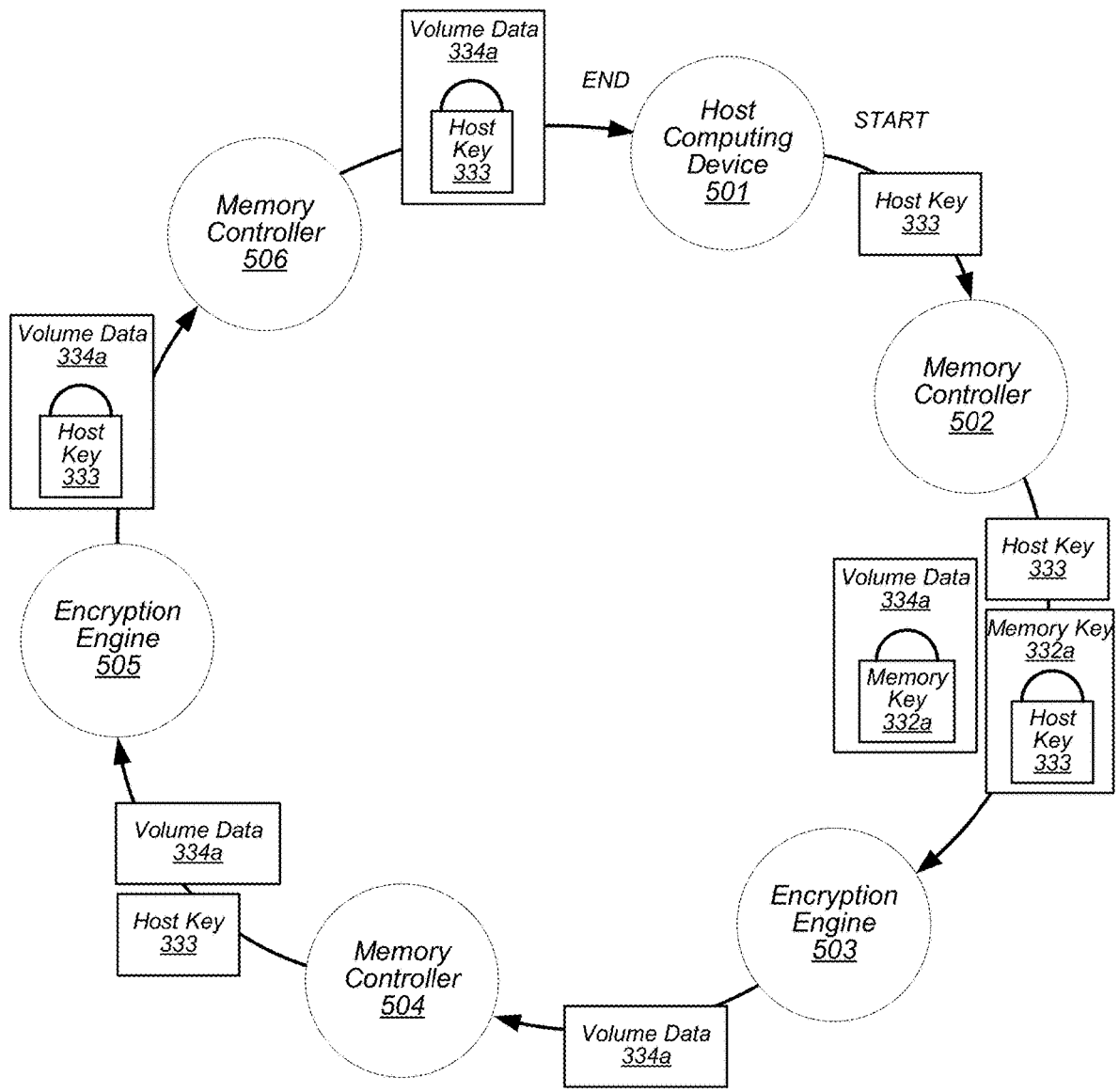
FIG. 5 shows a flow of information when reading encrypted data from a computing device.

Turning to FIG. 5, a flow of information when reading encrypted data from a target computing device is shown. FIG. 5 illustrates how the keys and data flow through various circuits when a host device reads encrypted data from a device that is in a target disk mode. The circles represent stages of the read process, numbered in an order in which they may occur, and indicate a particular circuit that is initiating a communication to the adjacent stage as indicated by the arrows. The circuits include a host computing device, such as, e.g., Host Computing Device 102, 202, or 302 in FIGS. 1, 2 and 3, and a memory controller and an encryption engine from a target computing device, such as, for example, Computing Device 101 or Target Computing Device 201 or 301. The rectangular boxes indicate what data, as presented in FIG. 3, is included in the communication. FIG. 5 assumes that the target computing device is in target disk mode and that the host computing device has already successfully authenticated with the target device.

In the illustrated embodiment, and referring to FIG. 3, Host Computing Device 302 sends a request to read encrypted data in a memory of a target computing device at stage 501. The request includes Host Key 333. The request is received by Target Computing Device 301 and routed to Memory Controller 340. In stage 502, Memory Controller 340 reads the requested data from Memory 350, e.g., Volume Data 334a encrypted with Memory key 332a. Memory Controller 340 then sends Host Key 333, encrypted Volume Data 334a and encrypted Memory key 332a to Encryption Engine 345. In other embodiments, Memory Controller 340 may send Host Key 333 and encrypted Memory key 332a first, and then send encrypted Volume Data 334a and decrypted Memory key 332a afterwards.

In stage 503, Encryption Engine 345 decrypts Memory key 332a using Host Key 333. Then, using the decrypted Memory key 332a, Encryption Engine 345 decrypts Volume Data 334a and sends the decrypted data back to Memory Controller 340. In stage 504, Memory Controller 340 sends the decrypted Volume Data 334a and Host Key 333 back to Encryption Engine 345. Encryption Engine 345, in stage 505, encrypts Volume Data 334a using Host Key 333 and sends the encrypted data back to Memory Controller 340. In stage 506, Memory Controller 340 sends encrypted Volume Data 334a to Host Computing Device 302. After receiving the encrypted data, Host Computing Device 302 may decrypt the data using a locally stored copy of Host Key 333.

It is noted that the embodiment of FIG. 5 is an example to demonstrate the flow of data and keys through the circuits of a target computing device and a host computing device. Variations of the illustrated stages may be used in other embodiments.

Figure 6:
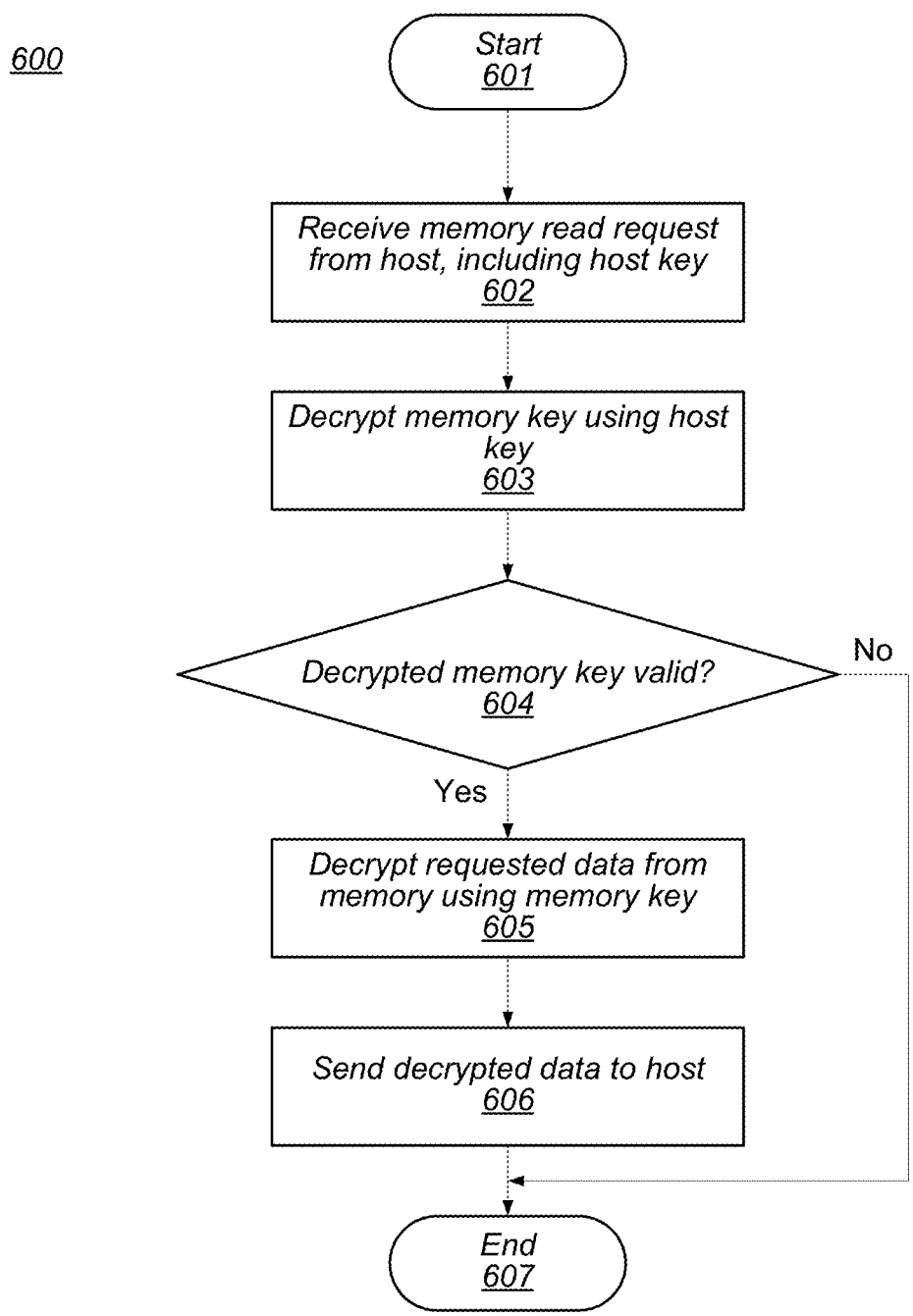
FIG. 6 depicts a flow diagram of an embodiment of a method for reading encrypted data from a computing device.

Moving to FIG. 6, a flow diagram of an embodiment of a method for reading encrypted data from a computing device is depicted. In various embodiments, Computing Device 101 or Target Computing Devices 201 or 301 may perform Method 600 while in a target disk mode. Referring collectively to FIG. 2 and the flow diagram of FIG. 6, Method 600 begins in block 601 with Target Computing Device 201 in target disk mode and Host Computing Device 202 having successfully been authenticated by Target Computing Device 201.

A target computing device receives a memory read request, including a host key, from a host device (block 602). In the illustrated embodiment, Target Computing Device 201 receives a request from Host Computing Device 202 to read encrypted data stored in Memory 250. The request may be received by Processor 210, via Communication Interface 220, and then routed to Memory Controller 240.

The target computing device decrypts a memory key using the host key (block 603). Memory Controller 240, in one embodiment, determines a location of the requested data, and then retrieves an encrypted copy of the memory key corresponding to this location. Memory Controller 240 sends the encrypted memory key and the received host key to Encryption Engine 235. Encryption Engine 235 decrypts the memory key using the host key, and sends the decrypted memory key back to Memory Controller 240.

Further operations of Method 600 may depend on a validity of the decrypted memory key (block 604). In some embodiments, the decrypted memory key may be verified to confirm that the memory key is valid. For example, the encrypted memory key, in addition to including the memory key, may also include a checksum value or one or more parity bits. After decrypting the memory key, Encryption Engine 235, Memory Controller 240, or other circuit, may perform a bitwise checksum or parity check of the decrypted memory key and then compare the determined result to the checksum or parity value that was included with the encrypted memory key. If the values match, then the key is assumed to be valid, and otherwise, invalid. If an incorrect host key is received, then the decrypted memory key is invalid. As long as a valid host key is received, then the decrypted memory key is valid. If the memory key is valid, then the method moves to block 605 to decrypt the requested data. If, however, the memory key is invalid, then the method ends in block 607.

If the memory key is valid, then the requested data is decrypted using the valid memory key (block 605). Memory Controller 240 sends the valid memory key and the encrypted volume data to Encryption Engine 235. Encryption Engine 235 decrypts the volume data and sends the decrypted data back to Memory Controller 240. In various embodiments, the encrypted data may be sent to Encryption Engine 235 all at once, or in smaller blocks to be decrypted one block at a time. The amount of data sent to Encryption Engine 235 may depend on a size of a buffer in Encryption Engine 235.

The decrypted data may be sent to the host device (block 606). In the illustrated embodiment, Memory Controller 240 sends the decrypted data corresponding to the memory request to Host Computing Device 202. In some embodiments, the connection between Host Computing Device 202 and Target Computing Device 201 may be considered secure, and the decrypted data is sent to Host Computing Device 202 without additional security measures. In other embodiments, however, Memory Controller 240 may send the decrypted volume data and the host key to Encryption Engine 235 to encrypt the volume data using the host key. The encrypted volume data is then sent to Host Computing Device 202 where it may be decrypted using a locally stored copy of the host key. The method ends in block 607.

It is noted that the method illustrated in FIG. 6 is an example of a read request in a target disk mode. In other embodiments, some operations may be performed in a different order. In various embodiments, additional operations may be included.

Figure 7:
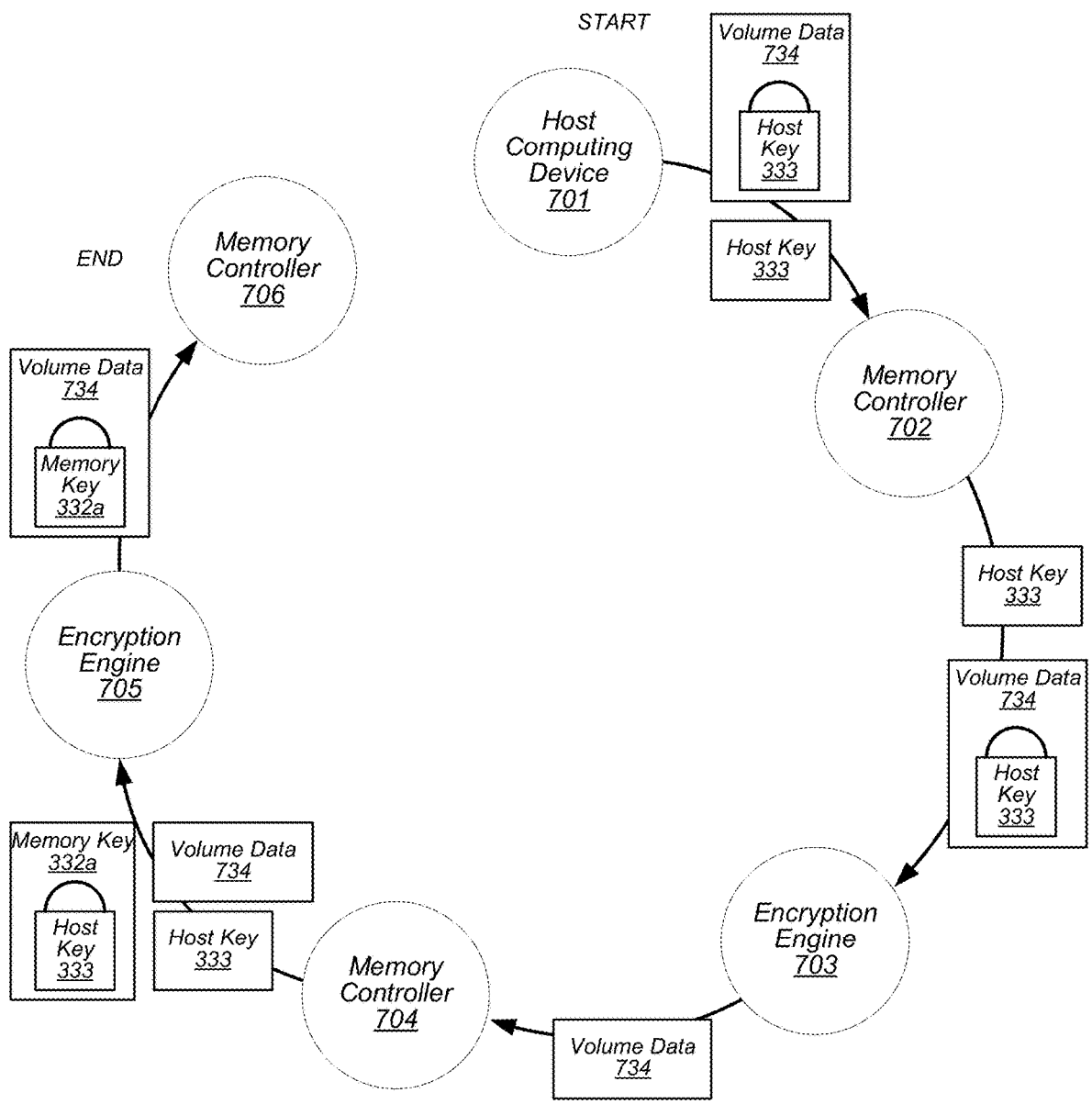
FIG. 7 illustrates a flow of information when writing data to be encrypted and stored on a computing device.

Proceeding to FIG. 7, a flow of information when writing data to be encrypted and stored on a computing device is illustrated. FIG. 7 illustrates how the keys and data flow through various circuits when a host device writes data to be encrypted onto a device that is in a target disk mode. Similar to FIG. 5, the circles represent stages of the write process, numbered in an order in which they may occur, and indicate a particular circuit that is initiating a communication to the adjacent stage as indicated by the arrows. The circuits include a host computing device, such as, e.g., Host Computing Device 102, 202, or 302 in FIGS. 1, 2 and 3, and a memory controller and an encryption engine from a target computing device, such as, for example, Computing Device 101 or Target Computing Device 201 or 301. The rectangular boxes indicate what data, as presented in FIG. 3, is included in the communication. FIG. 7 assumes that the target computing device is in target disk mode and that the host computing device has already successfully authenticated with the target device.

Referring to FIG. 3, Host Computing Device 302 sends a request to write data to a memory of a target computing device at stage 701. The request includes Host Key 333 as well as the data to be written. In the illustrated embodiment, the data, Volume Data 734, is encrypted by Host Computing Device 302 using Host Key 333. In other embodiments, however, the data link between Host Computing Device 302 and Target Computing Device 301 may be trusted, and Volume Data 734 may be sent unencrypted. In such cases, however, Host Key 333 is still sent with the write request.

The request is received by Target Computing Device 301 and, in one embodiment, is routed to Memory Controller 340. In stage 702, Memory Controller 340 sends Host Key 333 and encrypted Volume Data 734 to Encryption Engine 345 to decrypt the received Volume Data 734. In stage 703, Encryption Engine 345 decrypts Volume Data 735 using Host Key 333 and sends the decrypted Volume Data 734 back to Memory Controller.

In stage 704, Memory Controller 340 sends the decrypted Volume Data 734, Host Key 333, and encrypted Memory key 332a to Encryption Engine 345. Encryption Engine 345, in stage 705, decrypts Memory key 332a using Host Key 333 and then encrypts Volume Data 334a using the decrypted Memory key 332a. In some embodiments, Memory Controller 340 may send encrypted Memory key 332a and Host Key 333 to Encryption Engine 345 first, and then after Memory key 332a is decrypted, send the decrypted Volume Data 734 to be encrypted with Memory key 332a. After Volume Data 734 is encrypted using Memory key 332a, Encryption Engine 345 sends the encrypted Volume Data 734 back to Memory Controller 340. In stage 706, Memory Controller 340 stores encrypted Volume Data 734 in Memory 350.

It is noted that FIG. 7 merely demonstrates one embodiment of the flow of data and keys through the circuits of a target computing device and a host computing device during a memory write request. Variations of the depicted stages may be used in other embodiments.

Figure 8:
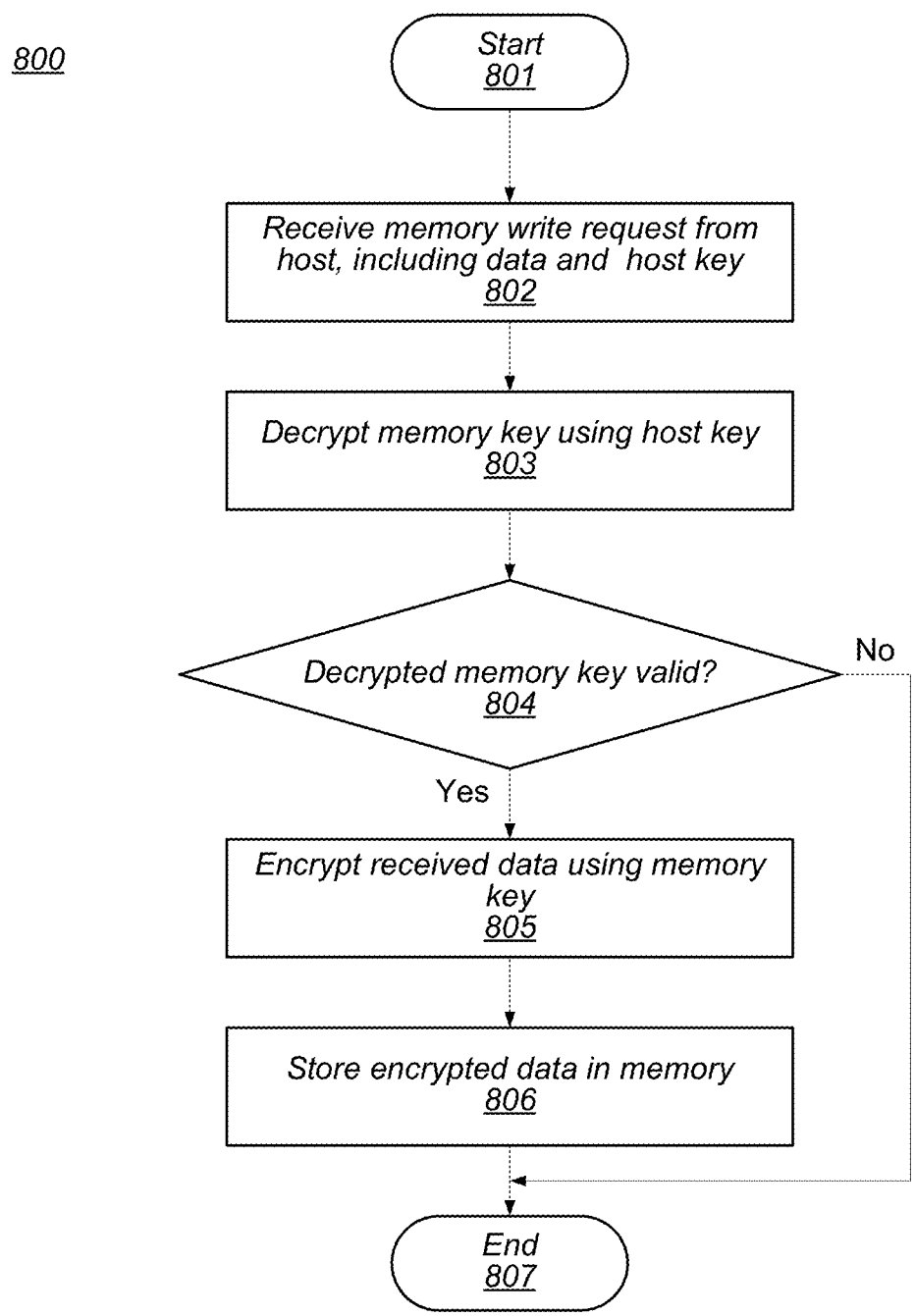
FIG. 8 shows a flow diagram of an embodiment of a method for writing data to be encrypted and stored on a computing device.

Turning now to FIG. 8, a flow diagram of an embodiment of a method for writing data to be encrypted and stored on a computing device in a target disk mode is depicted. In various embodiments, Method 800 may be performed by Computing Device 101 or Target Computing Devices 201 or 301 while in a target disk mode. Referring collectively to FIGS. 2 and 8, Method 800 begins in block 801 with Target Computing Device 201 in target disk mode and Host Computing Device 202 having successfully been authenticated by Target Computing Device 201.

A target computing device receives a memory write request, including a host key and data, from a host device (block 802). In the illustrated embodiment, Target Computing Device 201 receives a request from Host Computing Device 202 to write data into Memory 250. Processor 210 in Target Computing Device 201 may receive the request via Communication Interface 220, and then route the request to Memory Controller 240. In some embodiments, the data to be written may be encrypted by Host Computing Device 202 using, for example, the host key, in which case Memory Controller 240 sends the encrypted data and the host key to Encryption Engine 235 for decryption.

The target computing device decrypts a memory key using the host key (block 803). Memory Controller 240, in one embodiment, determines a location to store the received data, and then retrieves an encrypted copy of a memory key corresponding to this location. In some embodiments, Host Computing Device 202 may be authorized to access only a particular portion or volume of Memory 250, in which case, the determined location may be limited to the authorized portion. Memory Controller 240 sends the encrypted memory key and the received host key to Encryption Engine 235. Encryption Engine 235 decrypts the memory key using the host key, and sends the decrypted memory key back to Memory Controller 240.

Continuing operations of the method may depend on a validity of the decrypted memory key (block 804). In some embodiments, the decrypted memory key may be verified to confirm that the memory key is valid, similar to the description above in block 604 of Method 600 in FIG. 6. As previously described, Encryption Engine 235, Memory Controller 240, or another circuit in Target Computing Device 201, may perform a checksum or parity check of the decrypted memory key and then compare the determined result to a checksum or parity value that was included with the encrypted memory key. If the values match, then the key is assumed to be valid, and otherwise, invalid. If an invalid host key is received, then decryption of the memory key will fail, and the resulting key will be invalid. As long as a valid host key is received, then the decrypted memory key will be valid. If the memory key is valid, then the method moves to block 805 to encrypt the received data. If, however, the memory key is invalid, then the method ends in block 807.

If the memory key is valid, then the received data is encrypted using the valid memory key (block 805). Memory Controller 240 sends the valid memory key and the received data to Encryption Engine 235. Encryption Engine 235 encrypts the received data and sends the encrypted data back to Memory Controller 240. In various embodiments, the encrypted data may be sent to Encryption Engine 235 all at once, or in smaller blocks to be encrypted one block at a time. A buffer size in Encryption Engine 235 may determine the amount of data sent to Encryption Engine 235 at a given time.

The encrypted data is stored in the memory (block 806). In the illustrated embodiment, Memory Controller 240 stores the data received with the memory request, now encrypted with the memory key, into the determined location in Memory 250. The method ends in block 807.

It is noted that Method 800 in FIG. 8 is one example of a write request process for a computing device in a target disk mode. In other embodiments, some operations may be performed in various other orders. Some embodiments may include additional operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A target computing device, comprising:
  a security processor configured, while the target computing device is in a particular operating mode that allows a separate host computing device to utilize a portion of memory of the target computing device, to:
    receive a request for authentication in order to access encrypted data stored in the portion of memory, wherein the encrypted data is encrypted using a memory key;
    generate a host key in response to a successful authentication, wherein the host key is deliverable to the host computing device to permit access to the portion of memory; and
  a memory controller configured to:
    receive the host key from the security processor; and
    encrypt the memory key using the host key.

2. The target computing device of claim 1, further comprising a communication interface, and wherein the security processor is further configured to send the host key to the host computing device in response to a determination that the host computing device is physically connected to the communication interface.

3. The target computing device of claim 2, wherein the memory controller is further configured to delete the memory key encrypted with the host key in response to a determination that the host computing device is physically disconnected from the communication interface.

4. The target computing device of claim 1, wherein the memory controller is further configured to delete the memory key encrypted with the host key in response to a determination that a particular amount of time has elapsed since encrypting the memory key using the host key.

5. The target computing device of claim 1, wherein the memory controller is further configured to:
  receive the host key and a request to access a particular data item included in the portion of memory from the host computing device; and
  decrypt the memory key using the received host key.

6. The target computing device of claim 1, further comprising a main processor that is configured to enter the particular operating mode in response to a particular command received during a boot process.

7. The target computing device of claim 1, wherein the target computing device is partially inoperable.

8. A method, comprising:
  entering, by a target computing device, a particular operating mode that allows a separate host computing device to utilize a portion of memory of the target computing device;
  receiving, by the target computing device, a request for authentication in order to access the portion of memory, wherein data items stored in the portion of memory are encrypted using a memory key;
  generating, by the target computing device, a host key in response to a successful authentication; and encrypting, by the target computing device, the memory key using the host key, wherein the host key is deliverable to the host computing device to permit access to the portion of memory.

9. The method of claim 8, further comprising, in response to determining that the target computing device has entered the particular operating mode, sending, by the target computing device, the host key to the host computing device.

10. The method of claim 9, further comprising deleting, by the target computing device, a local copy of the host key in response to sending the host key to the host computing device.

11. The method of claim 8, further comprising entering, by the target computing device, the particular operating mode in response to a particular command received during a boot process, wherein the particular operating mode utilizes a portion of resources of the target computing device.

12. The method of claim 8, further comprising:
receiving, by the target computing device, the host key and a request to access a particular data item included in the portion of memory from the host computing device; and
decrypting, by the target computing device, the memory key using the received host key.

13. The method of claim 12, further comprising:
decrypting, by the target computing device, the particular data item using the decrypted memory key; and
encrypting, by the target computing device, the particular data item using the received host key.

14. The method of claim 8, further comprising deleting the memory key encrypted with the host key in response to determining that the target computing device has exited the particular operating mode.

15. A target computing device, comprising:
a security processor configured to generate and store a user key; and
a memory controller configured to:
encrypt, using a memory key, a portion of data stored in a memory; and
encrypt the memory key using the user key;
wherein the security processor is further configured to:
receive a request for authentication in order to access the encrypted portion of data;
generate a local copy of a host key in response to a successful authentication; and
wherein the memory controller is further configured to encrypt the memory key using the host key, wherein the host key is deliverable to a host computing device to permit access to the portion of data.

16. The target computing device of claim 15, wherein the security processor is further configured to send, in response to a determination that the target computing device has entered a particular operating mode, the host key to the host computing device, wherein the particular operating mode allows the host computing device to access the encrypted portion of data.

17. The target computing device of claim 16, wherein the security processor is further configured to delete the local copy of the host key in response to sending the host key to the host computing device.

18. The target computing device of claim 15, wherein the memory controller is further configured to delete the memory key encrypted with the host key in response to a determination that a particular amount of time has elapsed since encrypting the memory key using the host key.

19. The target computing device of claim 15, wherein the memory controller is further configured to:
receive the host key and a request to access a particular data item included in the portion of data from the host computing device; and
decrypt the memory key using the received host key.

20. The target computing device of claim 19, wherein the memory controller is further configured to:
decrypt the particular data item using the decrypted memory key; and
encrypt the particular data item using the received host key.

* * * * *